(12) United States Patent
Swanson, Sr.

(10) Patent No.: US 7,475,813 B2
(45) Date of Patent: Jan. 13, 2009

(54) SYSTEM AND METHOD OF USING RFID DEVICES TO ANALYZE CUSTOMER TRAFFIC PATTERNS IN ORDER TO IMPROVE A MERCHANT'S LAYOUT

(75) Inventor: Daniel R. Swanson, Sr., Midlothian, VA (US)

(73) Assignee: Capital One Financial Corporation, McLean, VA (US)

( * ) Notice: Subject to any disclaimer, the term of this patent is extended or adjusted under 35 U.S.C. 154(b) by 1044 days.

(21) Appl. No.: 10/774,093

(22) Filed: Feb. 6, 2004

(65) Prior Publication Data

US 2005/0177423 A1    Aug. 11, 2005

(51) Int. Cl.
*G06K 15/00* (2006.01)
(52) U.S. Cl. ............... 235/383; 235/385; 235/492
(58) Field of Classification Search ............ 235/383, 235/385, 435, 451, 487, 492; 705/16
See application file for complete search history.

(56) References Cited

U.S. PATENT DOCUMENTS

| | | | | |
|---|---|---|---|---|
| 5,541,835 | A | 7/1996 | Dextraze et al. | 364/401 R |
| 5,729,697 | A | 3/1998 | Schkolnick et al. | 395/223 |
| 6,032,127 | A | 2/2000 | Schkolnick et al. | 705/23 |
| 6,236,335 | B1 | 5/2001 | Goodwin, III | 340/825.49 |
| 6,424,264 | B1 | 7/2002 | Giraldin et al. | 340/573.1 |
| 6,507,279 | B2 | 1/2003 | Loof | 340/572.1 |
| 6,536,658 | B1 | 3/2003 | Rantze | 235/375 |
| 6,659,344 | B2 * | 12/2003 | Otto et al. | 235/381 |
| 7,006,982 | B2 * | 2/2006 | Sorensen | 705/10 |
| 2002/0080198 | A1 | 6/2002 | Giraldin et al. | 345/864 |
| 2002/0116274 | A1 | 8/2002 | Hind et al. | 705/23 |
| 2002/0161651 | A1* | 10/2002 | Godsey et al. | 705/22 |
| 2002/0165758 | A1 | 11/2002 | Hind et al. | 705/10 |
| 2003/0009364 | A1 | 1/2003 | Miyoshi et al. | 705/7 |
| 2004/0111320 | A1* | 6/2004 | Schlieffers et al. | 705/16 |

OTHER PUBLICATIONS

Notification of Transmittal of the International Search Report or the Declaration (PCT Rule 44.1) mailed Oct. 20, 2005, regarding International Application No. PCT/US2005/003886 and Written Opinion of the International Search Authority, 13 pages.

(Continued)

*Primary Examiner*—Seung H Lee
(74) *Attorney, Agent, or Firm*—Hunton & Williams LLP (57) ABSTRACT

According to one embodiment, a method for managing a merchant layout is provided. A card having an enabled RFID device coupled to the first card may be provided to a customer. Demographic data regarding the customer may be obtained. The traffic pattern of the customer within a merchant location may be determined by automatically tracking the position of the RFID device over time using a plurality of RFID detection devices. The demographic data and the traffic pattern of the first customer may be analyzed and a modification of a merchant layout associated with the merchant location may be determined based at least on the analysis of the demographic data and the traffic pattern of the first customer. The determined modification to the merchant layout may then be made.

20 Claims, 3 Drawing Sheets

OTHER PUBLICATIONS von Gunden, "Whose Afraid of RFID?", Integrated Solutions, pp. 1-3, http://www.integratedsolutionsmag.com/articles/2001_11/011110.htm, Nov. 2001.

McDonough, Jr., "TI Smart Tags Help Gap Customers Find Their Jeans", CRM News, pp. 1-3, http://www.crmdaily.com/perl/story/14773.html, Nov. 14, 2001.

Ustaran, "Data Protection and RFID Systems", Privacy & Data Protection, vol. 3, Issue 6, pp. 6-7, date unknown.

Albrecht, "Is Big Brother in your Grocery Cart", C.A.S.P.I.A.N., pp. 1-2, http://www.nocards.org/, 1999-2003.

Albrecht, "Food Industry News", C.A.S.P.I.A.N., pp. 1-16, http://www.nocards.org/news/index.shtml, 1999-2003.

Albrecht, "Food For Thought—Auto-ID: Tracking Everything Everywhere", C.A.S.P.I.A.N., pp. 1-5, http://www.nocards.org/AutoID/overview.shtml, 1999-2003.

Chai, "Tags Track Japanese Shoppers", CNET News.com, pp. 1-2, http://news.zdnet.co.uk/business/0,39020645,2134438,00.html, May 8, 2003.

Matthew, "RFID Tracking Makes it into Japanese Stores", Geek.com, pp. 1-6, http://www.geek.com/news/geeknews/2003May/gee20030509019926.htm, May 9, 2003.

Engels, "The Next Information Revolution: The Networked Physical World", Massachusetts Institute of Technology, 21 pages, http://www.autoidcenter.org/media/fmi_2002.pdf, 2002.

Simon, "What's in a Loyalty Card?", OutofRange.net, pp. 1-4, http://www.outofrange.net/blogarchive/archives/000291.html, Jul. 23, 2003.

Skrzyucki, "System's Trademark: Have a Slow Day", The Regulators, pp. 1-3, http://search.washingtonpost.com/wp-srv/WPlate/1999-11/19/0711-111999-idx.html, Nov. 19, 1999.

* cited by examiner

SYSTEM AND METHOD OF USING RFID DEVICES TO ANALYZE CUSTOMER TRAFFIC PATTERNS IN ORDER TO IMPROVE A MERCHANT'S LAYOUT

TECHNICAL FIELD OF THE INVENTION

This invention relates in general to radio frequency identity (RFID) devices and, more particularly, to a system and method of using RFID devices to analyze customer traffic patterns in order to improve a merchant's layout.

BACKGROUND OF THE INVENTION

Certain areas of a store or other merchant location are frequented by customers more often than other areas. As a result, certain categories of products and sections of the store incur lower sales than others. The reasons for this customer behavior are often unknown to the retailer. The retailer may wish to determine various aspects of the behavior of customers shopping in his store, such as the traffic pattern of each customer and how much time each customer spends in the store, so that the retailer may modify the physical layout of store or the placement of various products or product categories within the store in order to increase sales potential. To obtain such information, the retailer may use customer survey data or hire consultants to physically observe the traffic patterns of customers shopping in the store. The traffic pattern of a customer may be defined as the route of travel by a customer after entering a merchant location, such as a store or other establishment, which identifies where the customer travels and shops while in the merchant location.

SUMMARY OF THE INVENTION

In accordance with the present invention, systems and methods for using RFID devices to analyze customer traffic patterns in order to improve a merchant's layout are provided. According to one embodiment, a method for managing a merchant layout is provided. A card or other device having an enabled RFID device coupled to it may be provided to each of a number of customers. Demographic data regarding the customers may be obtained. The traffic patterns of the customers within a merchant location may be determined by automatically tracking the position of the RFID devices over time using a plurality of RFID detection devices. The demographic data and the traffic patterns of the customers may be analyzed and a modification of a merchant layout associated with the merchant location may be determined based at least on the analysis of the demographic data and the traffic patterns of the customers. The determined modification to the merchant layout may then be made.

According to another embodiment, a system for managing a merchant layout is provided. The system includes a card providing module, a data storage module, a plurality of RFID detection devices, a traffic pattern analysis module, and a layout analysis module. The card providing module may provide each of a number of customers a card or other device having an enabled RFID device coupled to the card or other device. The data storage module may receive and store demographic data regarding the customers. The plurality of RFID detection devices positioned in a merchant location may determine the location of the RFID device. The traffic pattern analysis module may receive position information from the plurality of RFID detection devices and determining the traffic pattern of the customers based on the received position information over time. The layout analysis module may determine a modification to be made to a merchant layout associated with the merchant location based at least on the demographic data and the traffic pattern of the customers.

According to yet another embodiment, a card is provided to a customer of a merchant having a merchant location. The card includes an enabled RFID device coupled to the card. The position of the RFID device may be automatically tracked by a plurality of RFID detection devices in order to determine the traffic pattern of the customer within the merchant location. The customer's traffic pattern and demographic data may be analyzed along with those of other customers in order to determine a modification to be made to the merchant layout.

Various embodiments of the present invention may benefit from numerous advantages. It should be noted that one or more embodiments may benefit from some, none, or all of the advantages discussed below.

One advantage of the invention is that a merchant can use RFID tags carried by customers to automatically track the location of various customers as they move throughout the merchant's premises. The merchant can use this location information to determine the traffic pattern of its customers, which may be analyzed along with various demographic information regarding the customers to determine modifications to be made to the merchant's store layout and product placement within the store, in order to increase sales potential. Thus, the merchant need not hire expensive consultants to physically observe customers' traffic patterns in order to determine such layout improvements, thus saving the merchant valuable expenses. In addition, traffic pattern information may be collected and analyzed in real-time or near real-time. Thus, the merchant may make modifications to the layout of his premises with little time delay.

Another advantage of the invention is that a merchant may provide a financial incentive for customers to carry RFID cards allowing the customers to be tracked while shopping at the merchant's store. For example, a merchant may provide a customer with a loyalty card having an RFID device that allows the customer to receive a 2% discount on all purchases made from the merchant in exchange for the customer allowing the merchant to track the customer.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 4 of the drawings, in which like numerals refer to like parts.

Figure 1:
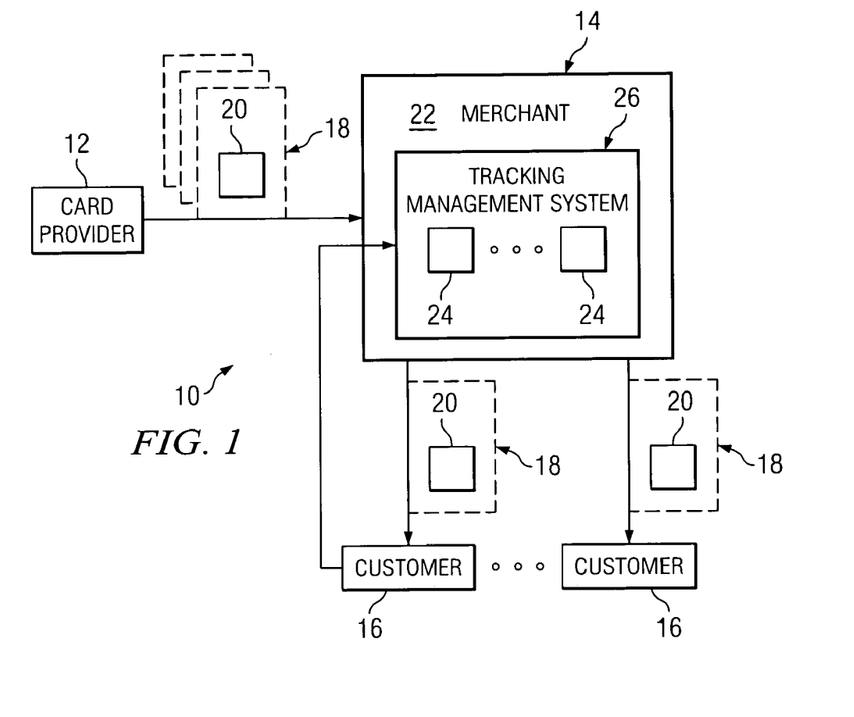
FIG. 1 illustrates an example system for using RFID cards to analyze the traffic pattern of customers in order to improve a merchant's layout in accordance with an embodiment of the present invention.

FIG. 1 illustrates an example system 10 for using cards having radio frequency identity (RFID) devices coupled thereto to analyze the traffic pattern of a customer in order to improve a merchant's layout. System 10 includes a card provider 12, a merchant 14, a plurality of customers 16, and a plurality of cards 18 each having an RFID device 20 coupled thereto. For the purposes of this discussion, cards 18 having an RFID device 20 are referred to as RFID cards 18. Generally, card provider 12 provides merchant 14 with RFID cards 18, which in turn provides such RFID cards 18 to its customers 16. Merchant 14 may also obtain and store demographic information from customers 16, such as information about the lifestyle of each customer 16. Merchant 14 has a merchant location 22, such as a store or mall for example, which includes a number of RFID detection devices 24 positioned throughout. When customers 16 having RFID cards 18 move through the merchant location 22, the RFID detection devices 24 track the position of each RFID card 18. RFID detection devices 24 may also time stamp the tracking of a customer 16 in order to determine the elapsed time that the customer 16 spends are various locations, such as in front of particular shelves or displays, for example, within the merchant location 22. This tracking information is collected and analyzed over time to determine the traffic patterns of customers 16 within merchant location 22. This traffic pattern information is then used along with demographic information regarding the customers 16 in order to improve store layouts, such as the store layout or product positioning, within merchant location 22 in order to increase sales potential for merchant 14.

The RFID cards 18 may be various types of cards, such as store affinity or loyalty cards specific to merchant 14, or credit cards having an affiliation to merchant 14, for example. Merchant 14 may offer customers 16 an option to receive an RFID card 18 having an enabled RFID device 20 or another similar card without an enabled RFID device 20. For example, merchant 14 may offer a customer 16 a choice between a store affinity card with an RFID device 20 or a similar card without an RFID device 20. Alternatively, merchant 14 may offer a customer 16 a store affinity card with an RFID device 20, but allow the customer 16 to choose whether or not to have the RFID device 20 enabled or disabled. Merchant 14 may provide the customer 16 an incentive in exchange for the customer 16 allowing merchant 14 to track the customer 16 through an RFID card 18. For example, merchant 14 may provide customer 16 a 1% discount on purchases made from merchant 14 for allowing merchant 14 to track the customer 16. In addition, merchant 14 may provide incentives to customers 16 having RFID card 18 based on the traffic pattern of such customers 16 or the amount of time such customers 16 spend within merchant location 22.

Card provider 12 may include any entity suitable for providing RFID cards 18 and/or other cards to merchants 14. Card provider 12 may itself manufacture or produce RFID cards 18, may outsource the production of RFID cards 18, or may purchase RFID cards 18 from a third party manufacturer. In particular embodiments, card provider 12 may include a bank, a credit union, a credit card provider, or other financial institution.

An RFID card 18 may be any card having an RFID device 20 attached thereto. The RFID device 20 may be attached to the card 18 in any suitable manner, such as being externally affixed to one side of the card 18 or embedded within the card 18, for example. The RFID device 20 may be an RFID tag and may include one or more RFID transmitters, RFID receivers, RFID transceivers, antennae, integrated circuits, memory and/or any other suitable components as known by those skilled in the art of RFID devices. Each RFID device 20 associated with a merchant 14 may have a different or unique identification code such that each RFID device 20 may be identified and distinguished from other RFID devices 20. The identification code may include one or more types of codes, such as a version number, a domain manager, a class code and/or a serial number. For example, in one embodiment, the identification code of each RFID device 20 is a 96-bit code.

As discussed above, an RFID card 18 may be any of a variety of types of cards, such as a store affinity card or a loyalty card specific to a particular merchant 14 (such as an Albertsons™ loyalty card, for example), or a credit card having an affiliation to a particular merchant 14 (such as a Lowes™ credit card, for example). A customer 16 may be any new, existing or potential customer of merchant 14 suitable to receive and carry an RFID card 18 within merchant location 22.

Merchant 14 may include any entity which sells goods and/or services and which has a physical location, indicated generally as merchant location 22. A merchant 14 may include a single entity (such as, for example, an individual store) or a number of entities (such as, for example, a chain of stores, a mall, a strip mall, or an outdoor market). A merchant 14 may include a seller or distributor that sells items produced by one or more otherwise unaffiliated producers. In addition or as an alternative, a merchant 14 may include a producer that sells one or more items it produces directly to customers 16, bypassing distributors. Although merchants 14 are described as selling items to customers 16, the present invention, as described above, contemplates any suitable transactions between merchants 14 and customers 16. As an example, a merchant 14 may rent one or more items to customers 16. As another example, a merchant 14 may include an entity which provides services to customers 16, such as a barber or auto mechanic, for example.

Merchant 14 includes a tracking management system 26 which provides various functionality associated with RFID cards 18. For example, tracking management system 26 may provide functions associated with providing RFID cards 18 to customers 16, enabling RFID devices 20 on RFID cards 18, tracking the location of RFID cards 18 within a merchant location 22 associated with merchant 14, analyzing traffic patterns of customers 16 within the merchant location 22, and determining how to modify the layout within merchant location 22 to increase sales potential.

One aspect of tracking management system 26 includes a plurality of RFID detection devices 24 positioned within or nearby merchant location 22 such that RFID detection devices 24 may determine the position of an RFID device 20 on an RFID card 18 within the merchant location 22. Each RFID detection device 24 may include an RFID tag reader and may include one or more RFID transmitters, RFID receivers, RFID transceivers, antennae, integrated circuits, controllers, clocks and/or any other suitable components as known by those skilled in the art of RFID devices.

The appropriate number, arrangement and positioning of RFID detection devices 24 within merchant location 22 may be determined based on a number of factors, such as the dimensions of the merchant location 22, the layout of structures and other physical items (such as columns, shelves, racks, display cases, registers, and products, for example) within merchant location 22, and the optimal or maximum distance for radio communications between RFID devices 20 and RFID detection devices 24.

Figure 2:
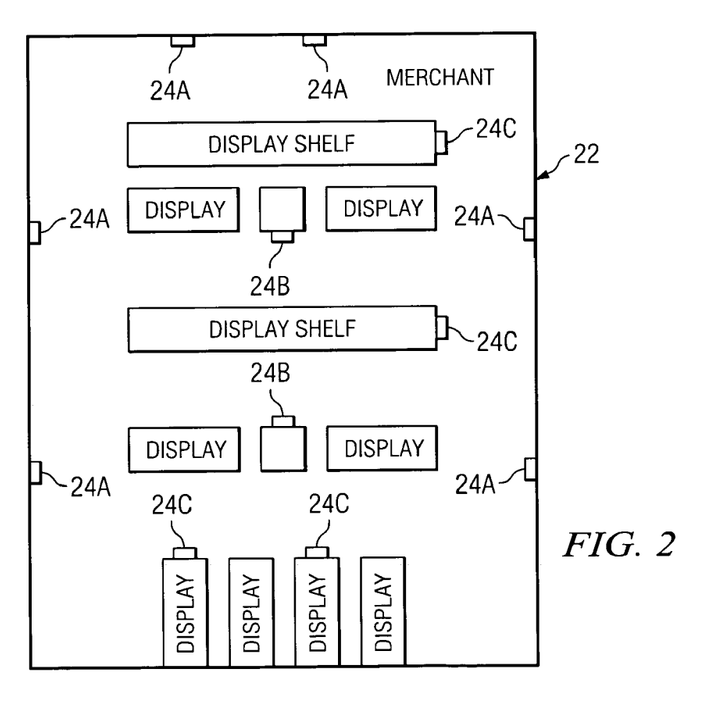
FIG. 2 illustrates a top view of an example arrangement of RFID detection devices within an example merchant location in accordance with the embodiment shown in FIG. 1.

FIG. 2 illustrates a top view of an example arrangement of RFID detection devices 24 within an example merchant location 22 according to an embodiment of the present invention. In this embodiment, a number of RFID detection devices 24A are positioned on various outer walls of merchant location 22, other RFID detection devices 24B are positioned on columns within merchant location 22, and still other RFID detection devices 24C are positioned on product display shelves within merchant location 22. In this embodiment, the RFID detection devices 24 (24A, 24B and 24C) are positioned such that an RFID device 20 is detectable by at least three RFID detection devices 24 regardless of the location of the RFID device 20 within merchant location 22. In other words, at least three of the RFID detection devices 24 may collect information regarding the position of the RFID device 20 as the RFID device 20 moves throughout merchant location 22. Thus, the position of RFID device 20 at any particular time may be determined by biangulation, triangulation or other calculations at any location of the RFID device 20 within merchant location 22. In addition, RFID detection devices 24 may timestamp the determined location of RFID device 20, which may indicate the date and time of day, for example. By collecting positional and/or time information from the RFID detection devices 24 and calculating the position of the RFID device 20 over time, the traffic pattern of the customer 16 within merchant location 22 may be determined. Further, in embodiments in which positional tracking information of RFID devices 20 is timestamped, the time spent by customers 16 at various locations within merchant location 22 may also be determined.

Using the Timestamp

Figure 3:
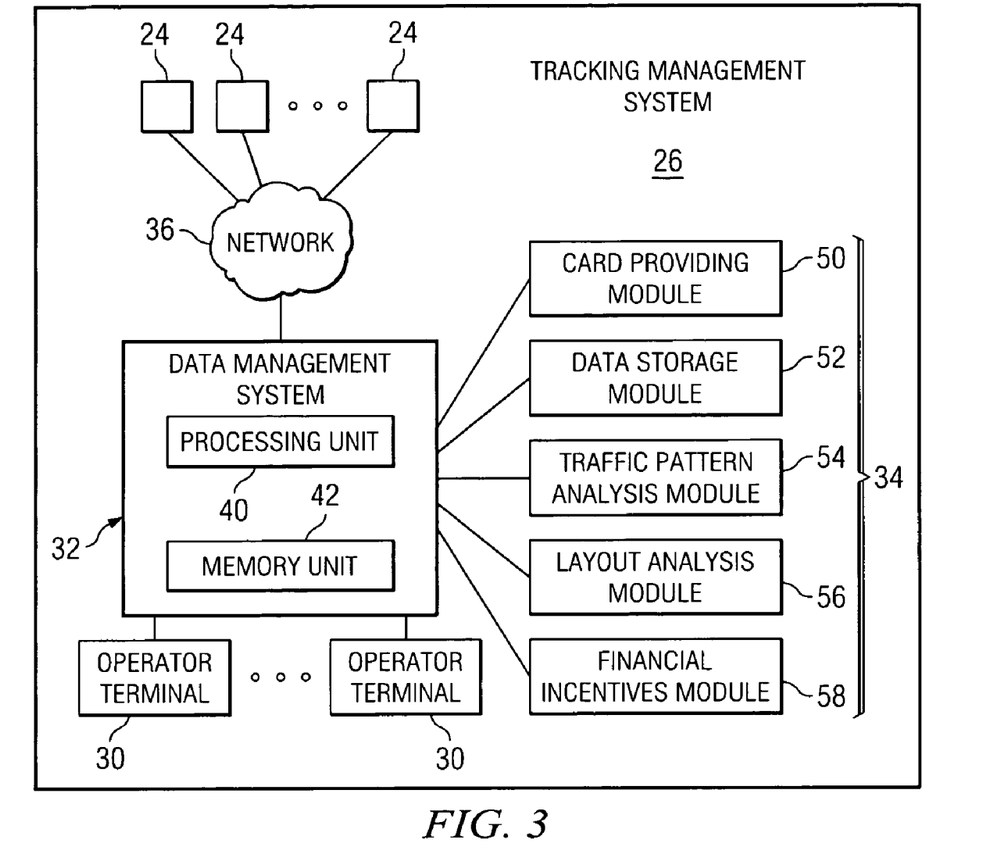
FIG. 3 illustrates a tracking management system of the merchant in accordance with the embodiment shown in FIG. 1.

FIG. 3 illustrates tracking management system 26 of merchant 14 in accordance with one embodiment of the invention. According to the illustrated embodiment, tracking management system 26 may include RFID detection devices 24, one or more operator terminals 30, a data management system 32, and one or more function modules 34. The components of tracking management system 26 may be located at one or more sites and may be coupled to each other using one or more links, each of which may include some or all of a computer bus, local area networks (LANs), metropolitan area networks (MANs), wide area networks (WANs), portions of the Internet, a public switched telephone network (PSTN), any other appropriate wireline, optical, wireless, or other suitable communication link, or any combination of the preceding. In particular, RFID detection devices 24 may be coupled to each other and/or to data management system 32 by a communications network 36 which may include one or more local area networks (LANs) or any other appropriate wireline, optical, wireless, or other links. In addition, it should be understood that one or more components of tracking management system 26 may not be located at merchant location 22.

An operator terminal 30 may provide an operator, such as a store clerk, manager, or store layout analyst, for example, with access to data management system 32 to configure, manage, or otherwise interact with data management system 32. An operator terminal 30 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Data management system 32 may manage data associated with customers 16 and/or RFID cards 18 (such as data stored in data storage module 52 discussed below, for example), which may in particular embodiments include creating, modifying, and deleting data files associated with customers 16 and/or RFID cards 18 automatically or in response to data received from RFID detection devices 24, operator terminals 30 or function modules 34. Additionally, data management system 32 may call the one or more function modules 34 to provide particular functionality according to particular needs, as described more fully below. Data management system 32 may include a data processing unit 40, a memory unit 42 and any other suitable components for managing data associated with customers 16 and/or RFID cards 18. The components of data management system 32 may be supported by one or more computer systems at one or more sites. One or more components of data management system 32 may be separate from other components of data management system 32, and one or more suitable components of data management system 32 may, where appropriate, be incorporated into one or more other suitable components of data management system 32.

Data processing unit 40 may process data associated with customers 16 and/or RFID cards 18, which may include executing coded instructions that may in particular embodiments be associated with the one or more function modules 34. Memory unit 42 may be coupled to data processing unit 40 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

A function module 34 may provide particular functionality associated with tracking management system 26. As an example only and not by way of limitation, a function module 34 may provide functionality associated with providing RFID cards 18 to customers 16, enabling or activating RFID devices 20 on RFID cards 18, tracking the location of RFID cards 18 within a merchant location 22 associated with merchant 14, analyzing traffic patterns of customers 16 within the merchant location 22, and determining how to modify the layout within merchant location 22 to increase sales potential. A function module 34 may be called by data management system 32 possibly as a result of data received from RFID detection devices 24, operator terminals 30 or function modules 34, for example. In response, the function module 34 may provide the particular functionality associated with the function module 34 and communicate one or more results to data processing unit 40 or one or more other suitable components of data management system 32. The communicated results may be used to create, modify, or delete one or more data files associated with one or more customers 16 and/or RFID cards 18, provide data to an operator at an operator terminal 30, or perform any other suitable task.

Function modules 34 are operable to perform various functions in the operation of the system 10. According to the embodiment shown in FIG. 2, function modules 34 include a card providing module 50, a data storage module 52, a traffic pattern analysis module 54, a layout analysis module 56, and a financial incentives module 58. Like data management system 32, function modules 34 may be physically distributed such that each function module 34 or multiple instances of each function module 34 may be located in a different physical location geographically remote from each other, from data management system 32, or even from merchant location 22.

In addition, each function module 34 may be partially or completely integrated with other function modules 34 and/or with other components of tracking management system 26. For example, particular function modules 34 may include operator terminals 30 such that at least a portion of the functionality of such function modules 34 is provided by human operators. Thus it should be understood that the functionality provided by each function module 34 may be completely automated, partially automated, or completely human-controlled.

Card providing module 50 may provide RFID cards 18 and/or other cards to customers 16. Card providing module 50 may include an automatic card dispenser that may be loaded with RFID cards 18 which may be dispensed to customers 16. Alternatively, card providing module 50 may include a kiosk or customer service area at which a customer 16 may receive an RFID card 18 from an employee such as a customer service representative. As another alternative, card providing module 50 may manage the mailing of RFID cards 18 to potential or existing customers 16 of merchant 14.

In some embodiments, card providing module 50 may offer a customer 16 a choice of different cards, including an RFID card 18 and one or more other cards. For example, card providing module 50 may offer a customer 16 a choice between a store loyalty card which is an RFID card 18 and a store loyalty card which is not an RFID card 18. The latter option may include offering the customer 16 a store loyalty card without an RFID device 20 coupled thereto, or a store loyalty card having a disabled or deactivated RFID device 20. For example, card providing module 50 may provide a customer 16 with an RFID card 18 having an un-activated RFID device 20. The customer 16 may then choose whether or not to have the RFID device 20 activated.

Card providing module 50 may offer a customer 16 an incentive for accepting an RFID card 18 and allowing the customer 16 to be tracked within the merchant location 22. This may involve offering the customer 16 an incentive to receive and carry an RFID card 18 having an active RFID device 20 rather than a similar card not having an active RFID device 20, or offering the customer 16 an incentive to activate a card having an un-activated RFID device 20. The incentive may be a financial incentive, such as a discount, rebate, refund, or coupon for purchases made while carrying an active RFID card 18. For instance, tracking management system 26 may identify a customer 16 carrying an active RFID card 18 when that customer 16 enters the merchant location 22, and provide the customer 16 a discount, rebate, refund, coupon, or other financial incentive for purchases made by the customer 16 during that shopping incident. As another example, suppose a particular merchant 14 offers merchant-specific credit cards or credit cards that are tied to the particular merchant 14. Card providing module 50 may offer a customer 16 a lower finance rate or other advantageous account feature to use a credit card having an active RFID device 20 (which may be referred to as an RFID credit card 18) rather than a similar credit card not having an active RFID device 20.

Data storage module 52 may receive and store demographic and other personal data regarding customers 16, such as a customer's name, age, gender, race, address, e-mail address, occupation, income, hobbies, and dietary information, for example. Such data may be obtained from an application for an RFID card 18 filled out by a customer 16 or otherwise obtained from the customer 16. Data storage module 52 may associate the identification code of each RFID card 18 with demographic information for the customer 16 or customers 16 associated with that card 18. Data storage module 52 may also manage such data, including making appropriate updates for various customers 16.

Data storage module 52 may also store customer tracking information, such as location and traffic pattern information received from RFID detection devices 24 and/or traffic pattern analysis module 54. Such information may be accessed and used by traffic pattern analysis module 54, layout analysis module 56 and/or financial incentives module 58 to provide the various functionality of such modules.

Data storage module 52 may include one or more databases which may include suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Data storage module 52 may be separate from or partially or completely integrated with memory unit 42.

Traffic pattern analysis module 54 may determine and analyze traffic patterns within a merchant location 22 of various customers 16 having RFID cards 18. In order to determine the traffic pattern of a customer 16, traffic pattern analysis module 54 may receive, such as via communications network 36, information collected from RFID detection devices 24 regarding an RFID device 20 on an RFID card 18 being carried by the customer 16 as customer 16 moves throughout merchant location 22. Traffic pattern analysis module 54 may use such information from RFID detection devices 24 in order to determine the location of the customer 16 over time, such as by biangulation, triangulation or other methods or calculations, thus tracking the location of customer 16. Since each RFID device 20 may have a different identification code, RFID detection devices 24 may simultaneously detect and collect information multiple RFID devices 20. From such information regarding multiple RFID devices 20, traffic pattern analysis module 54 may be able to track the location of multiple customers 16 over time.

Layout analysis module 56 may be operable to determine modifications to be made to the physical layout of the merchant location 22 based at least on the traffic patterns and/or the demographic data of various customers 16 who have been tracked by tracking management system 26. For example, layout analysis module 56 may index traffic patterns and demographic data for various customers 16 to determine which products to display in which locations and how to arrange product displays in order to optimize profitability, such as to increase the amount of time customers 16 spend in particular areas of merchant location 22, in order to increase sales potential. Layout analysis module 56 may obtain traffic pattern information and demographic data from data storage module 52, as discussed above. In one embodiment, layout analysis module 56 includes planogram software for determining optimal product placement and display parameters. Layout analysis module 56 may receive data continually or repeatedly such that ongoing or continuous modifications may be suggested for merchant location 22.

Financial incentives module 58 may provide a customer 16 financial incentives based on the traffic pattern determined for the customers 16 or the amount of time the customer 16 is located within a particular location, such as within merchant location 22 or within a particular area of merchant location 22. For example, financial incentives module 58 may provide the customer 16 a discount for every hour or particular fraction of an hour spent within merchant location 22. Financial incentives module 58 may obtain information regarding the traffic pattern and/or amount of time that a customer 16 spends in a particular area from data storage module 52.

Figure 4:
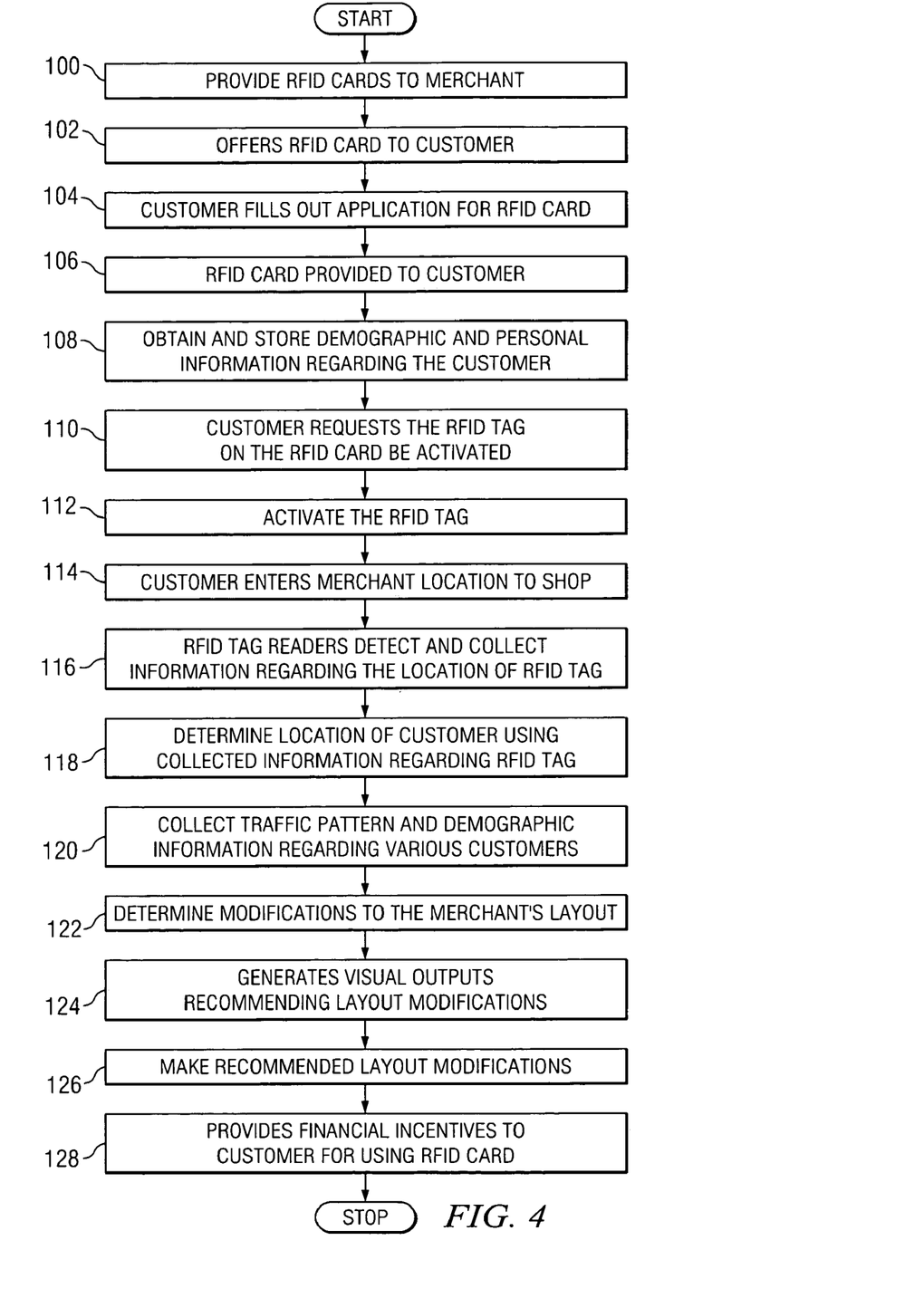
FIG. 4 illustrates an example method of using RFID cards to analyze the traffic patterns of customers in order to improve the layout of a merchant location in accordance with an embodiment of the present invention.

FIG. 4 illustrates an example method of using RFID cards 18 to analyze the traffic patterns of customers 16 in order to improve the layout of a merchant location 22. At step 100, card provider 12 provides a plurality of RFID cards 18 to merchant 14. In this embodiment, the RFID cards 18 are store affinity cards each having an un-activated RFID tag 20. At step 102, card providing module 50 of merchant 14 offers an RFID card 18 to a customer 16' of merchant 14. Card providing module 50 may also offer customer 16' a financial incentive for the customer to accept an RFID card 18 and activate the RFID tag 20 on the card 18. At step 104, the customer 16' fills out an application for the RFID card 18, which includes disclosing various demographic and personal information regarding the customer 16'. At step 106, card providing module 50 provides the RFID card 18 to customer 16'. At step 108, card providing module 50 extracts from the various demographic and personal information regarding the customer 16' from the application and communicates such information to be stored by data storage module 52. In an alternative embodiment, demographic and personal information regarding customer 16' may be stored in memory integrated into RFID card 18, rather than in an external database such as data storage module 52.

At step 110, customer 16' requests that card providing module 50 activate the RFID tag 20 on the RFID card 18. At step 112, card providing module 50 activates the RFID tag 20, such as by altering one or more bits or bytes stored on RFID tag 20. At step 114, customer 16' enters merchant location 22 in order to view the merchant's products (which may be referred to as "window shopping") and/or to make purchases from merchant 14. At step 116, one or more RFID tag readers 24 positioned at various locations around merchant location 22 detect and collect information regarding the location of RFID tag 20 carried by customer 16'. The RFID tag readers 24 are also able to detect and collect information regarding RFID tags 20 carried by other customers 16. The RFID tag readers 24 may distinguish each RFID tag 20 based on the unique identification code stored in, or as a part of, each RFID tag 20.

At step 118, RFID tag readers 24 communicate collected information regarding RFID tag 20 to traffic pattern analysis module 54, which uses such information to determine the location of customer 16' over time, such as by biangulation, triangulation or other methods, thus tracking the location of customer 16'. At step 120, layout analysis module 56 receives (1) traffic pattern information from traffic pattern analysis module 54 and/or data storage module 52, and (2) demographic and other information from data storage module 52 regarding various customers 16, including customer 16'. At step 122, layout analysis module 56 analyzes this information to determine modifications to be made to the physical layout of merchant location 22. For example, layout analysis module 56 indexes traffic pattern and demographic information for various customers 16, including customer 16', to determine how to rearrange products and product displays in order to leverage, optimize or influence customer traffic patterns or increase the amount of time customers 16 spend in particular areas of merchant location 22, thus increasing sales potential. In an alternative embodiment, at step 122, the information received at step 120 may be provided to a third party to analyze the layout of the merchant location 22 and recommend layout modifications. At step 124, layout analysis module 56 generates visual outputs recommending such layout modifications. For example, layout analysis module 56 may generate a computer-generated planogram for merchant location 22. At step 126, the results of the analysis performed by layout analysis module 56 are used to make various modifications to the layout of merchant location 22.

At step 128, financial incentives module 58 provides customer 16' financial incentives based on the amount of time customer 16 has spent within merchant location 22. In one embodiment, financial incentives module 58 provides customer 16' a $1 discount for each 20 minutes customer 16 spends within merchant location 22. Financial incentives module 58 may communicate this discount information to the registers of merchant 14 in order to customer 16' to receive the proper discounts.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method, comprising:
providing a first customer a first card having an enabled RFID device coupled to the first card;
obtaining demographic data regarding the first customer, the demographic data identifying customer information and preferences;
determining the traffic pattern of the first customer within a merchant location by automatically tracking the position of the RFID device over time using a plurality of RFID detection devices, the merchant location having a merchant layout defining a respective position of one or more products;
analyzing the demographic data and the traffic pattern of the first customer;
determining a modification to be made to the merchant layout based at least on the analysis of the demographic data and the traffic pattern of the first customer; and
making the modification to the merchant layout, the modification altering the position of at least one of the one or more products.

2. The method of claim 1, further comprising:
receiving a request from a second customer for a second card having a disabled RFID device coupled to the second card; and
providing the second customer a second card having a disabled RFID device.

3. The method of claim 1, further comprising:
allowing the first customer to select the first card having an enabled RFID device or a second card not having an enabled RFID device; and
offering the first customer a financial incentive to select the first card rather than the second card.

4. The method of claim 1, further comprising:
allowing the first customer to select whether to have the RFID device coupled to the first card enabled or disabled; and
offering the first customer a financial incentive to have the RFID device coupled to the first card enabled rather than disabled.

5. The method of claim 1, wherein the first card is a merchant affinity card.

6. The method of claim 1, wherein the first card is a credit card.

7. The method of claim 1, further comprising automatically generating a planogram for the merchant location based at least on the demographic data and the traffic pattern of the first customer.

8. The method of claim 1, further comprising providing the first customer financial incentives based on the determined traffic pattern of the first customer.

9. The method of claim 8, further comprising providing the first customer financial incentives based on the amount of time the first customer is located within a particular location.

10. A system, comprising:
a card providing module operable to provide a first customer a first card having an enabled RFID device coupled to the first card;
a data storage module operable to receive and store demographic data regarding the first customer, the demographic data identifying customer information and preferences;
a plurality of RFID detection devices positioned in a merchant location and operable to determine the location of the RFID device, the merchant location having a merchant layout defining a respective position of one or more products;
a traffic pattern analysis module operable to:
receive position information from the plurality of RFID detection devices; and
determining the traffic pattern of the fist customer based on the received position information over time; and
a layout analysis module operable to determine a modification to be made to the merchant layout based at least on the demographic data and the traffic pattern of the first customer, the modification altering the position of at least one of the one or more products.

11. The method of claim 10, wherein the card providing module is operable to:
receive a request from a second customer for a second card having a disable RFID device coupled to the second card; and
provide the second customer a second card having a disabled RFID device.

12. The method of claim 10, wherein the card providing module is operable to:
allow the first customer to select the first card having an enabled RFID device or a second card not having an enabled RFID device; and
offer the first customer a financial incentive to select the first card rather than the second card.

13. The method of claim 10, wherein the card providing module is operable to:
allow the first customer to select whether to have the RFID device coupled to the first card enabled or disabled; and
offer the first customer a financial incentive to have the RFID device coupled to the first card enabled rather than disabled.

14. The method of claim 10, wherein the first card is a merchant affinity card.

15. The method of claim 10, wherein the first card is a credit card.

16. The method of claim 10, wherein the layout analysis module is operable to automatically generate a planogram for the merchant location based at least on the demographic data and the traffic pattern of the first customer.

17. The method of claim 10, further comprising a financial incentives module operable to provide the first customer financial incentives based on the determined traffic pattern of the first customer.

18. The method of claim 17, wherein the financial incentives module provides the first customer financial incentives based on the amount of time the first customer is located within a particular location.

19. A card provided to a customer of a merchant having a merchant location, the card comprising an enabled RFID device coupled to the card, the position of the RFID device being automatically tracked by a plurality of RFID detection devices in order to determine the traffic pattern of the customer within the merchant location, the traffic pattern being analyzed in conjunction with demographic data regarding the customer in order to determine a modification to be made to the merchant layout, the demographic data identifying customer information and preferences, and the modification altering the position of at least one of the one or more products.

20. A system, comprising:
a computer system having a processor; and
a computer readable medium coupled to the computer system, the computer readable medium comprising a program operable, when executed by the processor, to:
enable an RFID device coupled to a card provided to a customer;
receive demographic data regarding the first customer, the demographic data identifying customer information and preferences;
receive from a plurality of RFTD detection devices tracking information regarding the position of the RFID device over time;
determine the traffic pattern of the first customer within a merchant location based on the received tracking information;
analyze the demographic data and the traffic pattern of the first customer; and
determine a modification to be made to a merchant layout associated with the merchant location based at least on the analysis of the demographic data and the traffic pattern of the first customer, the merchant layout defining a respective position of one or more products, and the modification altering the position of at least one of the one or more products.

* * * * *